US012306295B2

(12) United States Patent
Kawanami et al.

(10) Patent No.: US 12,306,295 B2
(45) Date of Patent: May 20, 2025

(54) DOPPLER DEVICE, AND DEPRESSION ANGLE ESTIMATION METHOD

(71) Applicant: FURUNO ELECTRIC CO., LTD., Hyogo (JP)

(72) Inventors: Satoshi Kawanami, Minoo (JP); Masahiko Mushiake, Takaishi (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 340 days.

(21) Appl. No.: 18/175,473

(22) Filed: Feb. 27, 2023

(65) Prior Publication Data

US 2023/0204766 A1 Jun. 29, 2023

Related U.S. Application Data

(63) Continuation-in-part of application No. PCT/JP2021/038925, filed on Oct. 21, 2021.

(30) Foreign Application Priority Data

Nov. 24, 2020 (JP) ................................. 2020-194724

(51) Int. Cl.
*G01S 15/58* (2006.01)
*G01K 11/24* (2006.01)

(52) U.S. Cl.
CPC ............ *G01S 15/582* (2013.01); *G01K 11/24* (2013.01)

(58) Field of Classification Search
CPC .............................. G01S 15/582; G01K 11/24
See application file for complete search history.

(56) References Cited

U.S. PATENT DOCUMENTS 4,118,782 A 10/1978 Allen et al.
6,577,557 B1 6/2003 Stottlemyer
(Continued)

FOREIGN PATENT DOCUMENTS

JP S60-181625 A 9/1985
JP H04-282484 A 10/1992
(Continued)

OTHER PUBLICATIONS

The extended European search report issued by the European Patent Office on Sep. 11, 2024, which corresponds to European Patent Application No. 21897564.7-1206 and is related to U.S. Appl. No. 18/175,473.

(Continued)

*Primary Examiner* — Krystine E Breier
(74) *Attorney, Agent, or Firm* — Studebaker Brackett PLLC

(57) ABSTRACT

A Doppler device including a transducer and processing circuitry is provided. The transducer transmits underwater ultrasonic wave and receives a reflected wave of the ultrasonic wave. The Doppler device generates a first echo signal from the reflected wave in a first direction making a depression angle $\theta$ with a receiving surface of the transducer, generates a second echo signal from the reflected wave in a second direction making the depression angle $\theta$ with the receiving surface, the second direction being different from the first direction, and generates a third echo signal in a third direction perpendicular to the receiving surface. The processing circuitry further calculates a first Doppler frequency of the first echo signal, a second Doppler frequency of the second echo signal, and a third Doppler frequency of the third echo signal. The processing circuitry further calculates the depression angle $\theta$ from the first, second and third Doppler frequencies.

13 Claims, 9 Drawing Sheets

(56) References Cited

U.S. PATENT DOCUMENTS

| | | | |
|---|---|---|---|
| 7,847,925 B2 | 12/2010 | Vogt | |
| 8,755,250 B1 * | 6/2014 | Ruffa | G01S 15/582 |
| | | | 367/90 |
| 9,817,116 B1 * | 11/2017 | Steenstrup | G01S 15/60 |
| 2013/0165777 A1 | 6/2013 | Kim et al. | |

FOREIGN PATENT DOCUMENTS

| | | |
|---|---|---|
| JP | H05-240719 A | 9/1993 |
| JP | H09-203634 A | 8/1997 |
| JP | H11-352225 A | 12/1999 |
| JP | 2011-089800 A | 5/2011 |
| JP | 2016-031362 A | 3/2016 |
| JP | 2020-128894 A | 8/2020 |
| WO | 2017/149637 A1 | 9/2017 |

OTHER PUBLICATIONS

International Search Report issued in PCT/JP2021/038925; mailed Jan. 11, 2022.

Speed of sound in sea water (Mackenzie empirical equation); fxSolver; online, URL: https://www.fxsolver.com/browse/formulas/Speed+of+sound+in+sea+water+%28Mackenzie+empirical+equation%29.

\* cited by examiner

DOPPLER DEVICE, AND DEPRESSION ANGLE ESTIMATION METHOD

CROSS-REFERENCE TO RELATED APPLICATION(S)

This application is a continuation-in-part application of PCT International Application No. PCT/JP2021/038925, which was filed on Oct. 21, 2021, and which claims priority to Japanese Patent Application No. JP2020-194724 filed on Nov. 24, 2020, the entire disclosures of each of which are herein incorporated by reference for all purposes.

TECHNICAL FIELD

The present disclosure relates to a Doppler device, and a depression angle estimation method for performing predetermined measurement using a Doppler effect.

BACKGROUND

There has long been a need in the field of marine fisheries to remotely measure from a ship a temperature of the middle layer of the sea, which directly affects the ecology of fish living in the middle layer, rather than the temperature of the surface layer, which can be easily measured by a thermometer equipped at the bottom of the ship (thermistors, etc.).

As a method for responding to such needs, a method for measuring water temperature at various depths by using a temperature probe is known. For example, a method of this kind is described in U.S. Pat. No. 4,118,782. However, this method has a problem that it is not possible to obtain a water temperature profile in real time.

As another method for responding to the above needs, there is known a method for calculating a water temperature of a surface of a reflector based on a temperature of the water surface, a relative velocity between the apparatus and the reflector (suspended target), and a Doppler frequency which is the frequency difference between the sound wave transmitted at a predetermined depression angle and the reflected wave. For example, a method of this kind is described in JP2016-031362. However, this method has a problem that the cost of the apparatus is increased because various detection units are required for calculating the water temperature.

As described above, the conventional two methods have a problem of not being able to obtain a water temperature profile in real time and a problem of increasing the cost of the apparatus. On the other hand, the sound velocity of ultrasonic waves propagating in water varies with changes in water temperature. Therefore, if the sound velocity profile in water is obtained simply and in real time, the water temperature profile in water can be calculated from the obtained sound velocity profile.

An object of the present disclosure is to provide a Doppler device, and a depression angle estimation method capable of obtaining the sound velocity or temperature in water at a low cost in real time.

The term "Doppler device" refers to a device that performs a predetermined measurement using a Doppler effect, and includes a Doppler sonar, a tidal current meter, and an ADCP (Acoustic Doppler Current profiler) or the like.

SUMMARY

A first aspect of the present disclosure relates to a Doppler device. The Doppler device according to this aspect includes a transducer and processing circuitry. The transducer transmits underwater ultrasonic wave and receives a reflected wave of the ultrasonic wave. The processing circuitry generates a first echo signal from the reflected wave in a first direction making a depression angle $\theta$ with a receiving surface of the transducer, generates a second echo signal from the reflected wave in a second direction making the depression angle $\theta$ with the receiving surface of the transducer, the second direction being different from the first direction, and generates a third echo signal from the reflected wave in a third direction perpendicular to the receiving surface of the transducer. The processing circuitry further calculates a first Doppler frequency of the first echo signal, a second Doppler frequency of the second echo signal, and a third Doppler frequency of the third echo signal. The processing circuitry further calculates the depression angle $\theta$ from the first Doppler frequency, the second Doppler frequency and the third Doppler frequency.

The processing circuitry may further calculate a sound velocity of ultrasound in water and/or a water temperature from the depression angle $\theta$.

A second aspect of the present disclosure relates to a depression angle estimation method. The depression angle estimation method according to this aspect includes transmitting underwater ultrasonic wave from a transducer, receiving a reflected wave of the ultrasonic wave with the transducer, generating a first echo signal from the reflected wave in a first direction making a depression angle $\theta$ with a receiving surface of the transducer, generating a second echo signal from the reflected wave in a second direction making the depression angle $\theta$ with the receiving surface, the second direction being different from the first direction, generating a third echo signal from the reflected wave in a third direction perpendicular to the receiving surface, calculating a first Doppler frequency of the first echo signal, calculating a second Doppler frequency of the second echo signal, calculating a third Doppler frequency of the third echo signal, and calculating the depression angle $\theta$ from the first Doppler frequency, the second Doppler frequency, and the third Doppler frequency.

A third aspect of the present disclosure relates to a non-transitory computer-readable medium having stored thereon computer-executable instructions for causing a control processing circuit of a Doppler device which transmits an ultrasonic wave into water by a transducer and receives a reflected wave of the ultrasonic wave to generate a first echo signal in a first direction making a depression angle $\theta$ with a receiving surface of the transducer, a second echo signal in a second direction making the depression angle $\theta$ with the receiving surface, the second direction being different from the first direction, and a third echo signal in a third direction perpendicular to the receiving surface, the computer-executable instructions when executed by a computer, cause the computer to calculate a first Doppler frequency of the first echo signal, calculate a second Doppler frequency of the second echo signal, calculate a third Doppler frequency of the third echo signal, and calculate the depression angle $\theta$ from the first Doppler frequency, the second Doppler frequency, and the third Doppler frequency.

As described above, according to the present disclosure, it is possible to provide a Doppler device, and a depression angle estimation method capable of obtaining a water temperature profile or a sound velocity profile in water at low cost in real time.

The effect or significance of the present disclosure will become more apparent from the following description of the embodiments. However, the following embodiments are merely example embodiments of the present disclosure, and the present disclosure is not limited to those described in the following embodiments.

DETAILED DESCRIPTION

Embodiments of the present disclosure will be described below with reference to the drawings. In the following embodiments, as an example of the Doppler device, the present disclosure is applied to a Doppler sonar installed on the hull of a fishing boat or the like. However, the following embodiments are example embodiments of the present disclosure, and the present disclosure is not limited in any way to the following embodiments.

<Depression Angle θ Estimating Method>

Figure 1:
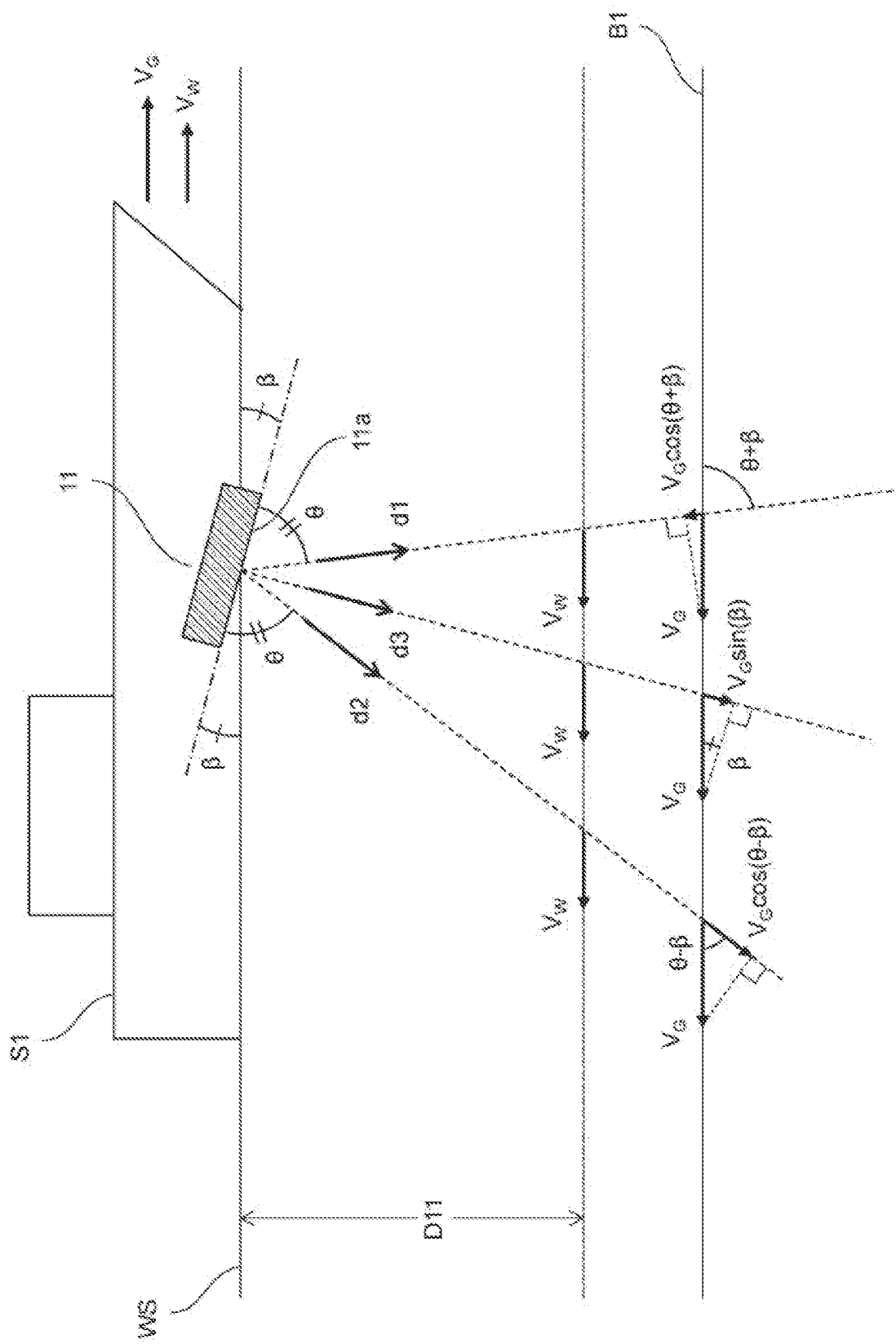
FIG. 1 is a view illustrating a configuration used in a method for estimating a depression angle θ according to a first embodiment.

FIG. 1 is a view illustrating a configuration used in the method of estimating the depression angle θ according to the embodiment.

As illustrated in FIG. 1, in this estimation method, a transducer 11 is installed at the bottom of a ship S1. The transducer 11 transmits ultrasonic waves into water and receives reflected waves of the ultrasonic waves. The transducer 11 is installed at the bottom of the ship so that a receiving surface 11a forms an angle β other than 0 degrees with respect to the water surface WS (rad). The inclination direction of the receiving surface 11a is parallel to a plane including a traveling direction of the ship S1 and the vertical direction.

The transducer 11 is capable of generating an echo signal based on a reflected wave in a 1st direction d1 and a 2nd direction d2 inclined respectively back and forth by a depression angle θ (rad) to the receiving surface 11a, and in a 3rd direction d3 perpendicular to the receiving surface 11a. The 1st direction d1, the 2nd direction d2 and the 3rd direction d3 are included in a same plane perpendicular to the wave receiving surface 11a. This plane is parallel to the traveling direction of the ship S1. The depression angle θ is, for example, 60° (pi/3 rad), and the angle β is, for example, 10° (pi/18 rad).

The ultrasonic waves transmitted in the first direction d1 and the second direction d2 with the depression angle θ set in this way change their traveling directions in a direction parallel to the plane including the first direction d1, the second direction d2, and the third direction d3 with the change of sound velocity and temperature in the depth direction. As a result, the depression angle θ between the traveling direction of the ultrasonic waves transmitted in the 1st direction d1 and the 2nd direction d2, and the receiving surface 11a changes depending on the water depth. Therefore, if the depression angle θ at each water depth can be estimated, the state of sound velocity and temperature at the water depth can be estimated. In this embodiment, the depression angle at each water depth is estimated by the following method.

In the configuration of FIG. 1, when the speed over ground of the ship S1 is $V_G$ (m/s) and the speed over water of the ship S1 is $V_W$ (m/s), the relative speed in the sound axis direction in the 1st direction d1 between the transducer 11 and the seabed B1 is $V_G \cos(θ+β)$. Therefore, when the transmission frequency of the transducer 11 is f0 and the sound velocity near the seabed is c, the 1st Doppler frequency fd1 observed in the 1st direction d1 is calculated by the following equation.

$$fd1 = \frac{2f_0}{c} V_G \cos(θ + β) \tag{1}$$

Similarly, the second Doppler frequency fd2 observed in the second direction d2 and the third Doppler frequency fd3 observed in the third direction d3 are calculated by the following equations.

$$fd2 = -\frac{2f_0}{c} V_G \cos(θ - β) \tag{2}$$

$$fd3 = -\frac{2f_0}{c} V_G \sin β \tag{3}$$

Accordingly, the following equation can be obtained from the above equations (1) to (3).

$$\frac{fd1 + fd2}{fd3} = \frac{\cos(θ+β) - \cos(θ-β)}{-\sin β} = \frac{-2\sin θ \sin β}{-\sin β} = 2\sin θ \tag{4}$$

From the above equation (4), the first Doppler frequency fd1 in the first direction d1, the second Doppler frequency fd2 in the second direction d2, and the third Doppler frequency fd3 in the third direction d3 of the reflected wave reflected from the seabed B1 are extracted from a first echo signal in the first direction d1, a second echo signal in the second direction d2, and a third echo signal in the third direction d3, and the estimated value of the depression angle θ from the seabed B1 can be calculated.

When flow velocity is constant at each water depth, the velocity $V_W$ between the ship S1 and the water in the sea becomes constant at each water depth. In this case, the first Doppler frequency fd1, the second Doppler frequency fd2, and the third Doppler frequency fd3 at each water depth are obtained by replacing $V_G$ in equations (1) to (3) with $V_W$. Therefore, the estimated depression angle θ at each water depth can also be calculated by the calculation of the above equation (4).

In this case, the depression angle θ at each depth can be calculated by extracting the first Doppler frequency fd1 in the first direction d1, the second Doppler frequency fd2 in the second direction d2, and the third Doppler frequency fd3 in the third direction d3 from the first echo signal in the first direction d1, the second echo signal in the second direction d2, and the third echo signal in the third direction d3 for the reflected wave reflected by the suspended target or the like (reflector) at each depth. For example, from the 1st echo signal in the 1st direction d1, the 2nd echo signal in the 2nd direction d2, and the 3rd echo signal in the 3rd direction d3, the frequency at a position (time position) corresponding to water depth D11 in FIG. 1 is extracted as the 1st Doppler frequency fd1, the 2nd Doppler frequency fd2, and the 3rd Doppler frequency fd3, and applied to Equation (4), thereby the estimated value of the depression angle θ at the water depth D11 can be calculated.

First Embodiment

An example of the configuration of the Doppler sonar to which the method for estimating the depression angle θ is applied will be described below. In the following Doppler sonar, the depression angle θ is estimated based on the above estimation method, and a sound velocity profile and a temperature profile at each water depth are generated from the estimated depression angle θ.

Figure 2:
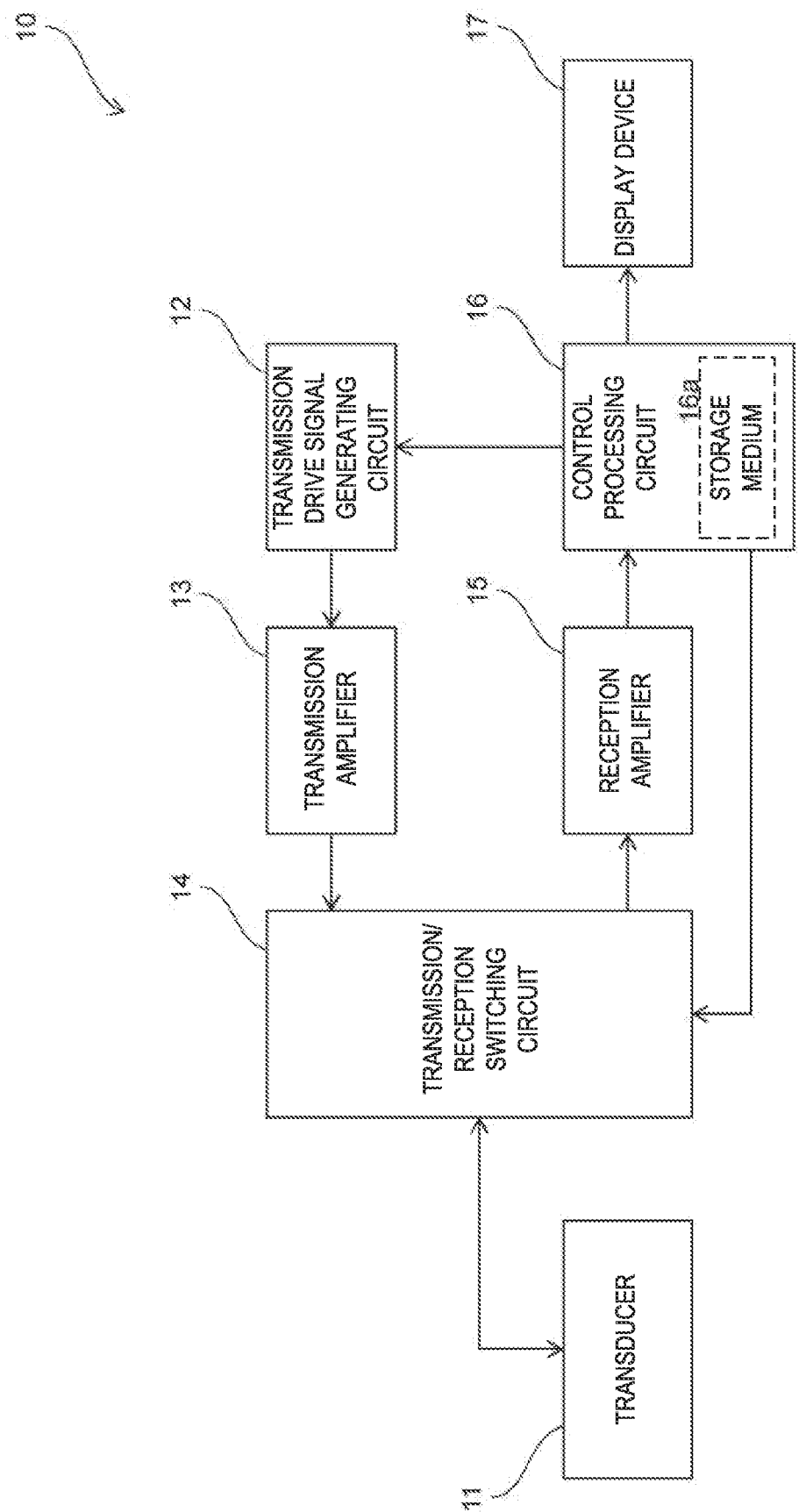
FIG. 2 is a block diagram illustrating a configuration of a Doppler sonar according to the first embodiment.

FIG. 2 is a block diagram illustrating a configuration of a Doppler sonar 10 according to the first embodiment.

As illustrated in FIG. 2, the Doppler sonar 10 includes the transducer 11, a transmission drive signal generating circuit 12, a transmission amplifier 13, a transmission/reception switching circuit 14, a reception amplifier 15, a control processing circuit 16 (which may also be referred to as processing circuitry 16), and a display device 17.

Figure 3:
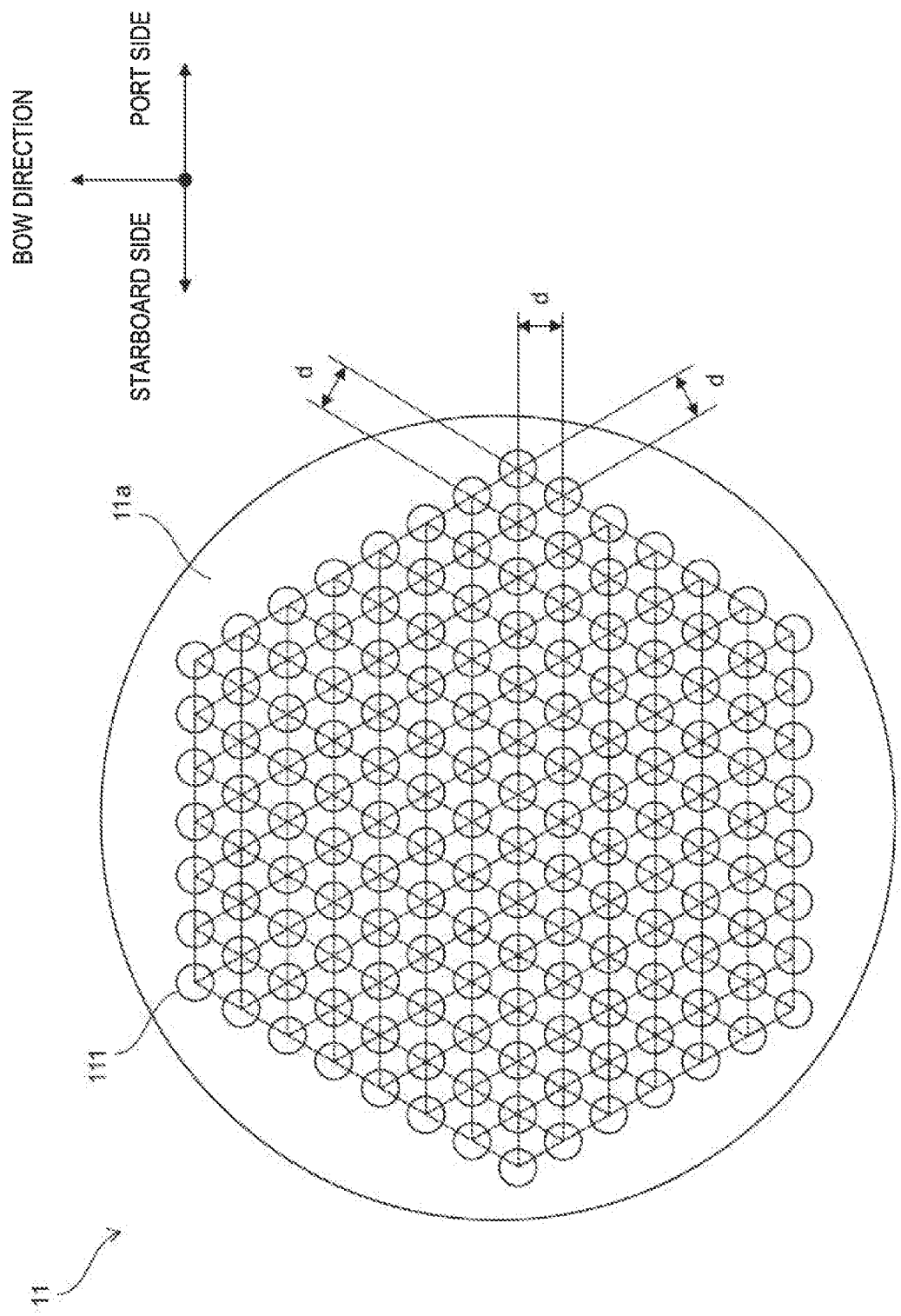
FIG. 3 is a view schematically illustrating a configuration of a transducer according to the first embodiment.

FIG. 3 is a view schematically illustrating a configuration of the transducer 11.

The transducer 11 has a configuration in which a large number of transducer elements 111 are arranged on a same plane at a predetermined pitch d. Each transducer element 111 transmits an ultrasonic wave by applying a transmission drive signal, and receives a reflected wave of the ultrasonic wave to generate a reception signal. Wave transmit/receive surfaces of the transducer elements 111 are on a same plane. This plane is the receiving surface 11a of the transducer 11. When a wavelength (reference wavelength of ultrasound) of the transmission drive signal is λ, the pitch d of the transducer elements 111 is set to, for example, (⅔)λ. As described above, the transducer 11 is disposed so as to be inclined with respect to the water surface WS (horizontal plane when the ship S1 is in a horizontal attitude) by the angle β (rad).

Referring back to FIG. 2, the transmission drive signal generating circuit 12 outputs a transmission drive signal having a transmission frequency f0 to the transmission amplifier 13 under the control of the control processing circuit 16. The transmission amplifier 13 amplifies the transmission drive signal input from the transmission drive signal generating circuit 12 and outputs the amplified signal to the transmission/reception switching circuit 14. The transmission/reception switching circuit 14, under the control of the control processing circuit 16, outputs the transmission drive signal input from the transmission drive signal generating circuit 12 to each transducer element 111 of the transducer 11. Thus, the ultrasonic wave of the transmission frequency f0 is transmitted from each transducer element 111. Further, the transmission/reception switching circuit 14, under the control of the control processing circuit 16, outputs to the reception amplifier 15 a reception signal output from each transducer element 111 receiving the reflected ultrasonic wave.

The reception amplifier 15 amplifies and removes noise from the reception signals received from each transducer element 111 via the transmission/reception switching circuit 14, and outputs the amplified reception signals to the control processing circuit 16. The control processing circuit 16 includes an arithmetic processing circuit such as a CPU (Central Processing Unit), a ROM (Read Only Memory), a RAM (Random Access Memory), and a storage medium such as a hard disk. The control processing circuit 16 performs estimation processing of the depression angle θ and generation processing of the sound velocity profile and the temperature profile based on the depression angle θ by controlling each unit according to a program stored beforehand in a storage medium 16a. The control processing circuit 16 may also include an integrated circuit such as an FPGA (Field-Programmable Gate Array).

The display device 17 is constituted by a liquid crystal display or the like, and displays an image showing the sound velocity profile or the temperature profile generated by the control processing circuit 16. The display device 17 may not necessarily be integrated with a processing unit including the transmission drive signal generating circuit 12, the transmission amplifier 13, the transmission/reception switching circuit 14, the reception amplifier 15, and the control processing circuit 16. When the display device 17 comprises a general-purpose display, the display device 17 is installed on the ship S1 as a device different from the Doppler sonar 10 and connected to the processing unit of the Doppler sonar 10 via a signal wire.

Figures 4A, 4B:
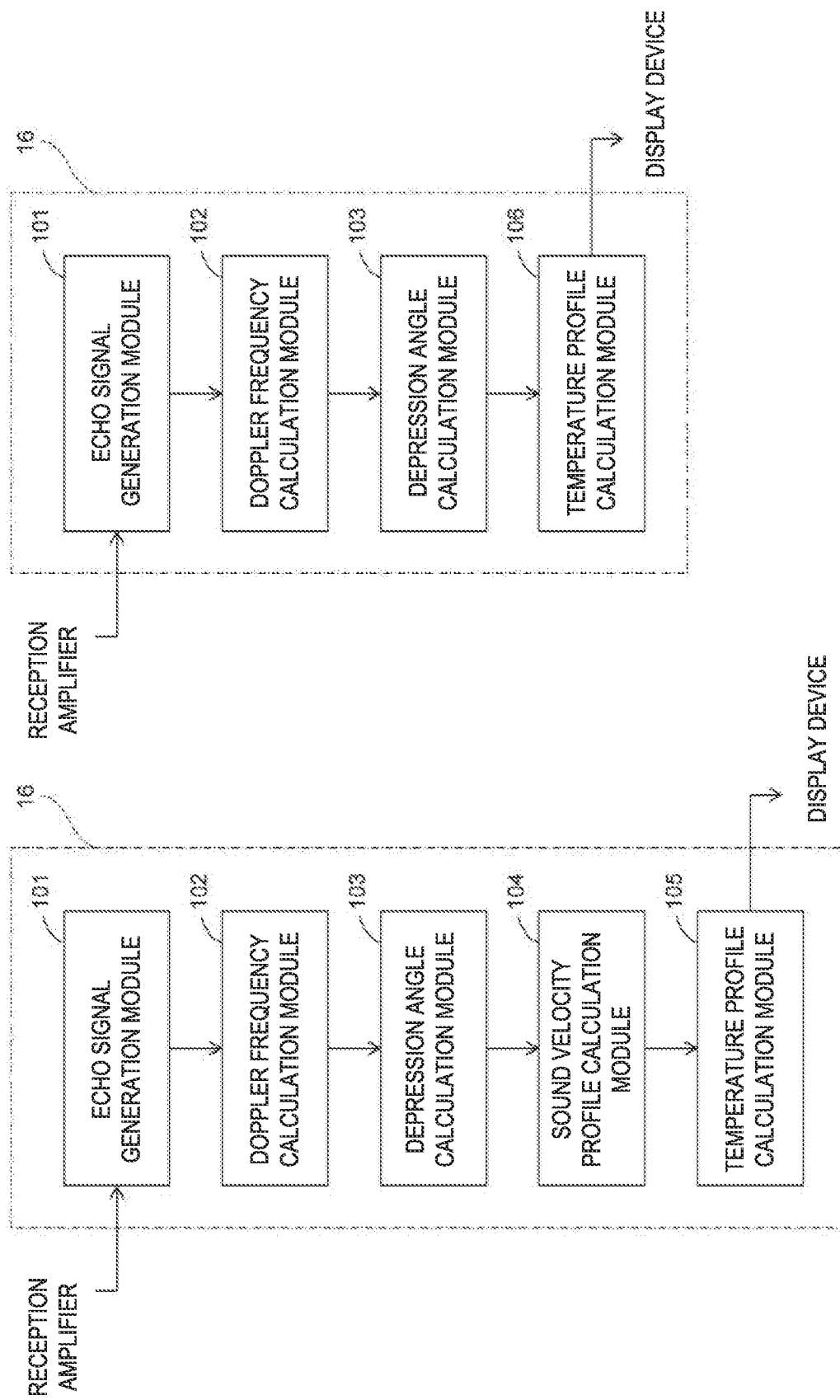
FIG. 4A is a block diagram illustrating a configuration of a control processing circuit according to the first embodiment.
FIG. 4B is a block diagram illustrating another configuration of the control processing circuit according to the first embodiment.

FIG. 4A is a block diagram illustrating a configuration of the control processing circuit 16.

The control processing circuit 16 includes an echo signal generation module 101, a Doppler frequency calculation module 102, a depression angle calculation module 103, a sound velocity profile calculation module 104, and a temperature profile calculation module 105. These modules may be implemented in software by a program stored in the storage medium 16a of the control processing circuit 16 or may be constituted in hardware on a logic circuit.

Figure 5:
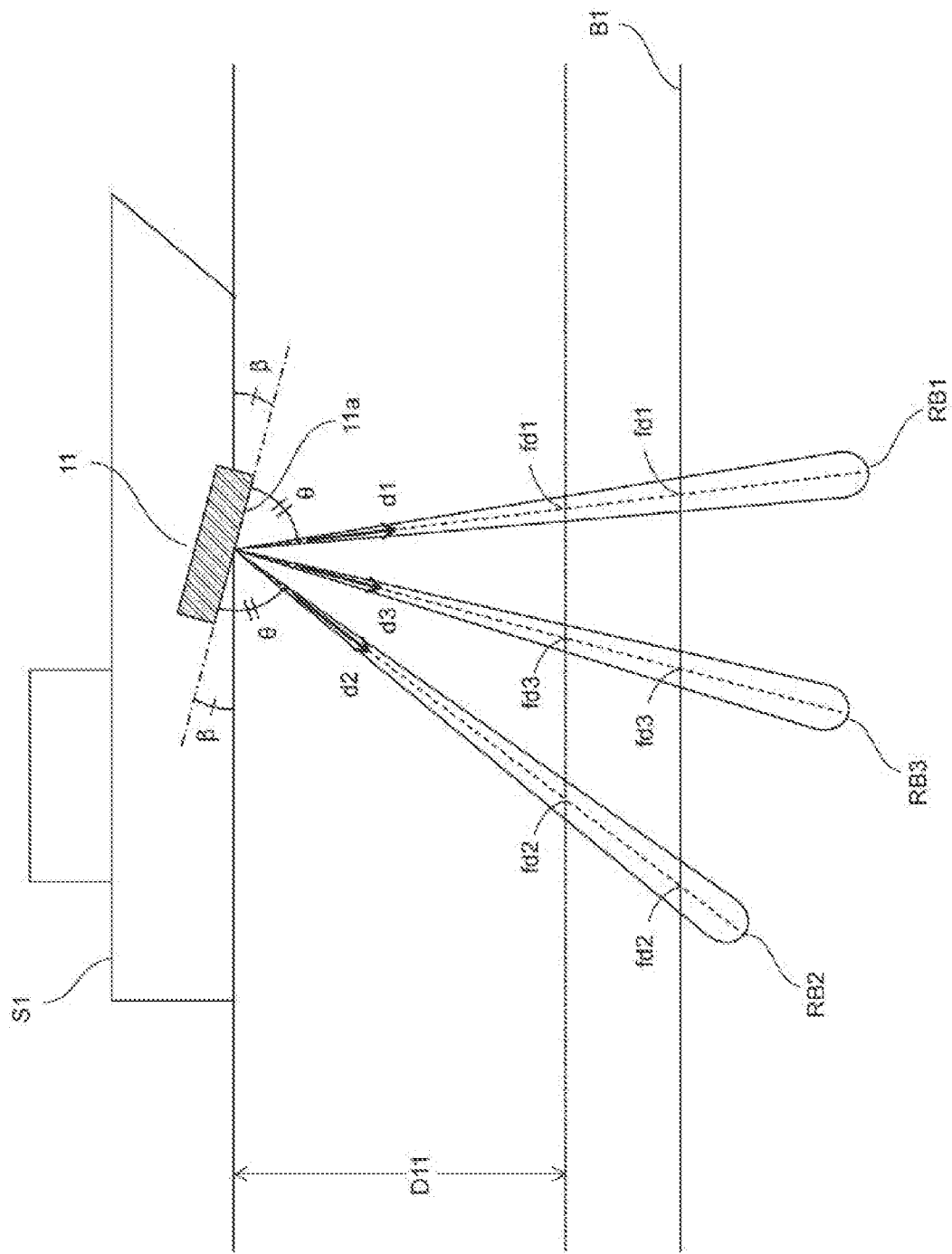
FIG. 5 is a view schematically illustrating a state of formation of reception beams according to the first embodiment.

The echo signal generation module 101 applies phase control (beam forming) to the received signals from the respective transducer elements 111 inputted from the reception amplifier 15 to form a 1st reception beam RB1 in the 1st direction d1, a 2nd reception beam RB2 in the 2nd direction d2, and a 3rd reception beam RB3 in the 3rd direction d3 as illustrated in FIG. 5, and generates the 1st echo signal, the 2nd echo signal, and the 3rd echo signal from these reception beams.

As illustrated in FIG. 5, the first reception beam RB1, the second reception beam RB2, and the third reception beam RB3 are formed with a predetermined angle width. Therefore, even if the traveling direction of the ultrasonic wave and the reflected wave changes within a range of the angle width due to the temperature change in the water, the first echo signal, the second echo signal and the third echo signal from the reflected wave can be properly generated.

Returning to FIG. 4A, the Doppler frequency calculation module 102 calculates the 1st Doppler frequency fd1 of the 1st echo signal, the 2nd Doppler frequency fd2 of the 2nd echo signal, and the 3rd Doppler frequency fd3 of the 3rd echo signal at each water depth. Specifically, the Doppler frequency calculation module 102 specifies time positions of the respective depths of the 1st echo signal, the 2nd echo signal, and the 3rd echo signal from the elapsed time after transmitting the ultrasonic wave, and extracts the frequencies of the 1st echo signal, the 2nd echo signal, and the 3rd echo signal at the specified time positions as the 1st Doppler frequency fd1, the 2nd Doppler frequency fd2, and the 3rd Doppler frequency fd3 at the respective depths, respectively.

The depression angle calculation module 103 calculates the depression angle θ at each water depth by applying the 1st Doppler frequency fd1, the 2nd Doppler frequency fd2, and the 3rd Doppler frequency fd3 at each water depth to the equation (4). Thus, a depression angle profile in which the depth of water and the depression angle θ are associated with each other is generated. The depression angle calculation module 103 outputs the generated depression angle profile to the sound velocity profile calculation module 104.

The sound velocity profile calculation module 104 calculates sound velocity at each water depth from the depression angle θ at each water depth. A predetermined equation is established between the depression angle θ and the sound velocity. For example, when the depression angle θ in the 1st direction d1 and the 2nd direction d2 with respect to the receiving surface 11a is set to 60° (pi/3 rad), and the pitch d of the transducer elements 111 is ⅔ of the wavelength λ of the transmission drive signal, the following equation is established between the depression angle θ and the sound velocity c.

$$\cos\theta = \frac{c}{3f0 \cdot d} \quad (5)$$

The sound velocity profile calculation module 104 calculates the sound velocity c at each water depth by applying the depression angle θ at each water depth, the transmission frequency f0 of the transmission drive signal, and the pitch d between the transducer elements 111 to the equation (5). Thus, a sound velocity profile in which the depth of water and the sound velocity c are associated with each other is generated. The sound velocity profile calculation module 104 outputs the generated sound velocity profile to the temperature profile calculation module 105.

The temperature profile calculation module 105 calculates the temperature at each water depth from the sound velocity c at each water depth. A predetermined equation such as Machenzie equation is established between the sound velocity and the temperature. The temperature profile calculation module 105 calculates the temperature at each water depth by applying the sound velocity c at each water depth to this equation. Thus, a temperature profile in which the water depth and the temperature are associated is generated. The temperature profile calculation module 105 outputs the generated temperature profile to the display device 17. Thus, the display device 17 displays the temperature profile indicating the temperature at each water depth.

Here, the sound velocity c is temporarily calculated from the depression angle θ, and the temperature is further calculated from the sound velocity c, but the temperature may be directly calculated from the depression angle θ. In this case, the configuration of the control processing circuit 16 is changed as illustrated in FIG. 4B. In this configuration, the sound velocity profile calculation module 104 is omitted, and the temperature profile calculation module 105 is changed to a temperature profile calculation module 106. The temperature profile calculation module 106 directly calculates the temperature at each water depth from the depression angle θ at each water depth with an equation that combines the calculation formula that specifies the relationship between the depression angle θ and the sound velocity c and the calculation formula that specifies the relationship between the sound velocity c and the temperature. Thus, a temperature profile that associates water depth and temperature is generated.

Figure 6:
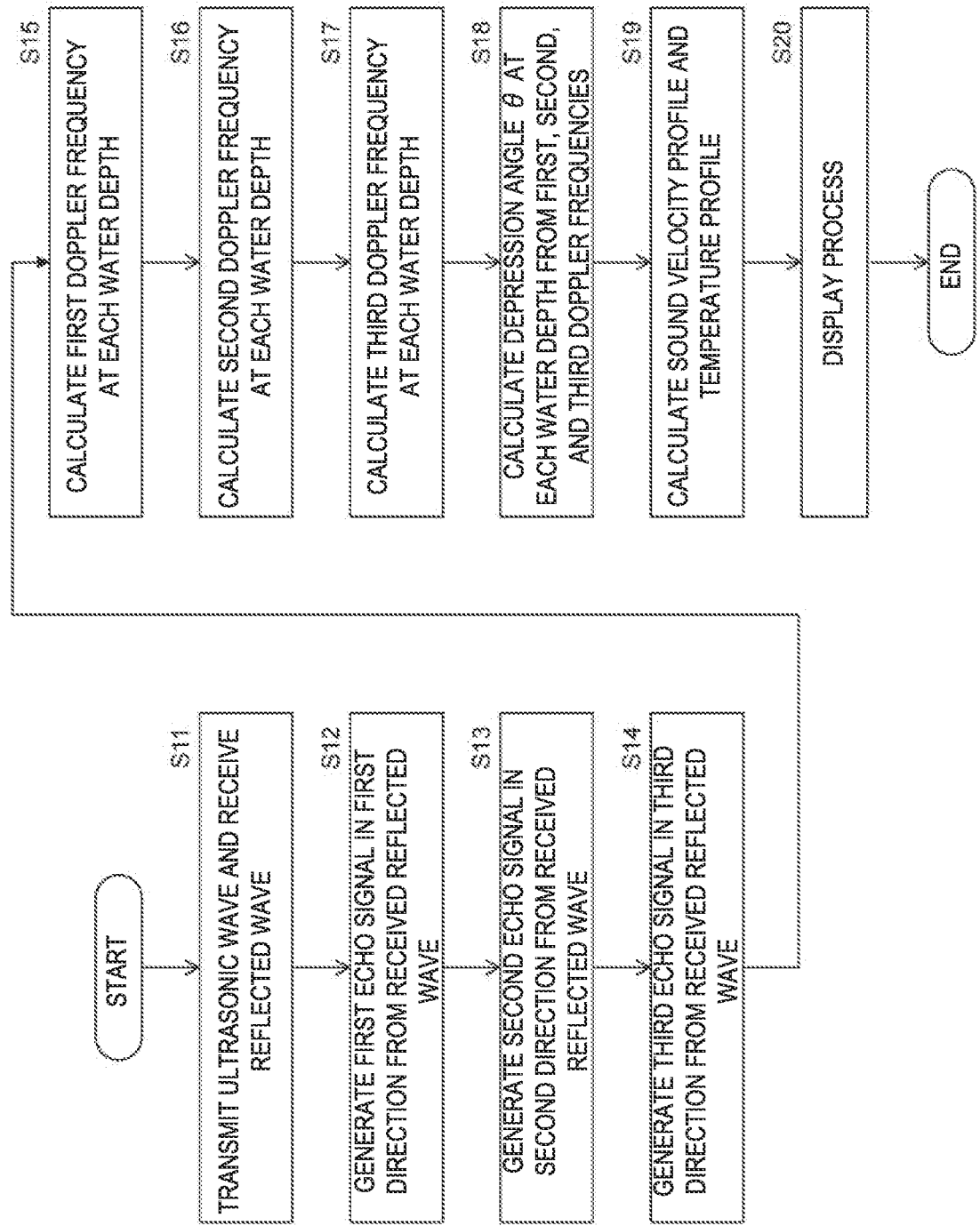
FIG. 6 is a flowchart illustrating a temperature profile generation process performed by the control processing circuit according to the first embodiment.

FIG. 6 is a flowchart illustrating a temperature profile generation process performed by the control processing circuit 16.

First, the control processing circuit 16 transmits the ultrasonic wave at the transmission frequency f0 from the transducer 11, and receives the reflected wave by the transducer 11 (S11). Next, in the echo signal generation module 101, the control processing circuit 16 generates, from the reflected wave received by the transducer 11 (received signals output from each transducer element 111), the 1st echo signal in the 1st direction d1 (S12), and generates the 2nd echo signal in the 2nd direction d2 and the 3rd echo signal in the 3rd direction d3 (S13, S14). As described with reference to FIG. 5, these echo signals are generated by forming the first reception beam RB1, the second reception beam RB2, and the third reception beam RB3 by beam forming.

Further, the control processing circuit 16 calculates the 1st Doppler frequency fd1, the 2nd Doppler frequency fd2, and the 3rd Doppler frequency fd3 at each water depth from the 1st echo signal, the 2nd echo signal, and the 3rd echo signal in the Doppler frequency calculation module 102 (S15, S16, and S17). These Doppler frequencies are calculated by extracting the frequencies of the echo signals at the time positions corresponding to the respective water depths, as described above.

Then, in the depression angle calculation module 103, the control processing circuit 16 applies the 1st Doppler frequency fd1, the 2nd Doppler frequency fd2, and the 3rd Doppler frequency fd3 at each water depth to the equation (4) to calculate the depression angle θ at each water depth (S18).

After calculating the depression angle θ at each water depth, the control processing circuit 16 calculates the sound velocity c at each water depth (sound velocity profile) by applying the depression angle θ at each water depth to the equation (5) in the sound velocity profile calculation module 104, and calculates the temperature at each water depth (temperature profile) by applying the sound velocity c at each water depth to a predetermined equation such as the equation of Machenzie in the temperature profile calculation module 105 (S19).

The control processing circuit 16 outputs the temperature profile calculated in step S19 to the display device 17. Thus, in the display device 17, processing for displaying the temperature profile is performed (S20).

When the processing for one ping is completed, the control processing circuit 16 executes the processing from step S11 at the start timing of the next ping. This updates the temperature profile display. The control processing circuit 16 repeatedly executes the processing of steps S11 to S20 for each ping. Thus, the temperature profile immediately below the ship S1 at each time point is sequentially displayed on the display device 17. The user can confirm the temperature profile at each water depth in real time by referring to an image displayed on the display device 17.

In step S20, without any limitation to the temperature profile, the sound velocity profile and the depression angle profile may be further displayed. Moreover, when the control processing circuit 16 has the configuration illustrated in FIG. 4B, the temperature profile is directly calculated from the depression angle θ at each water depth in step S19. Also in this case, in step S20, the temperature profile immediately below the ship S1 is sequentially displayed on the display device 17 in real time.

Effects of the First Embodiment

According to the first embodiment, the following effects can be obtained.

With a simple configuration using the transducer 11, the depression angle θ can be calculated in real time. Further, by applying the calculated depression angle θ to the equation (4), the sound velocity of the ultrasonic wave in water can be calculated, and further, by applying the calculated sound velocity to an equation such as the equation of Machenzie, the temperature in water can be calculated. Therefore, according to the Doppler sonar 10 of the present embodiment, the sound velocity and temperature in water can be obtained at a low cost in real time.

As illustrated in FIG. 6, the Doppler frequency calculation module 102 calculates the 1st Doppler frequency fd1, the 2nd Doppler frequency fd2, and the 3rd Doppler frequency fd3 from the 1st echo signal, the 2nd echo signal, and the 3rd echo signal at a plurality of water depths (S15 to S17), and the depression angle calculation module 103 calculates the depression angle θ at each of the plurality of water depths (S18). Thus, by applying the depression angle θ calculated at each water depth to the equation (4), the sound velocity profile at each water depth can be obtained, and further, by applying the calculated sound velocity profile to an equation such as the equation of Machenzie, the temperature profile at each water depth can be obtained.

As illustrated in FIG. 1, the 1st direction d1, the 2nd direction d2, and the 3rd direction d3 are set in the same plane perpendicular to the receiving surface 11a of the transducer 11 and parallel to the traveling direction of the ship S1. Thus, the difference between the first Doppler frequency fd1 and the second Doppler frequency fd2 can be maximized, and the calculation accuracy of the depression angle θ can be maximized. As a result, the accuracy of the sound velocity or the water temperature calculated from the depression angle θ can be most enhanced.

As illustrated in FIG. 1, the receiving surface 11a of the transducer 11 forms the angle β which is not 0 degrees with respect to the water surface WS. By tilting the receiving surface 11a with respect to the water surface WS in this manner, the depression angle θ can be calculated even in a state where there is no upwelling current, and the sound velocity or the water temperature can be calculated from the calculated depression angle θ.

As shown in the above equation (4), the depression angle calculation module 103 calculates the depression angle θ based on a ratio of the 1st Doppler frequency fd1 and the 3rd Doppler frequency fd3 (fd1/fd3) and a ratio of the 2nd Doppler frequency fd2 and the 3rd Doppler frequency fd3 (fd2/fd3).

Alternatively, the depression angle calculation module 103 calculates the depression angle θ based on a sum of the 1st Doppler frequency fd1 and the 2nd Doppler frequency fd2 (fd1+fd2) and the multiplicative inverse of the 3rd Doppler frequency fd3 (1/fd3). As described above, according to this calculation method, the depression angle θ can be properly calculated using the first Doppler frequency fd1, the second Doppler frequency fd2, and the third Doppler frequency fd3.

As illustrated in FIG. 4A, the Doppler sonar 10 further includes a sound velocity profile calculation module 104 for calculating the sound velocity c of ultrasonic waves in water from the depression angle θ calculated by the depression angle calculation module 103. Thus, the sound velocity of the ultrasonic wave at the predetermined water depth can be calculated by the Doppler sonar 10.

As illustrated in FIG. 4A, the Doppler sonar 10 further includes a temperature profile calculation module 105 for calculating the water temperature from the sound velocity c. Thus, the Doppler sonar 10 can calculate the temperature at the predetermined depth of water.

As illustrated in FIG. 4B, the Doppler sonar 10 may include the temperature profile calculation module 106 for calculating the water temperature from the depression angle θ calculated by the depression angle calculation module 103. According to this configuration, the temperature in water can be directly calculated from the depression angle θ calculated by the depression angle calculation module 103 without calculating the sound velocity of the ultrasonic wave in water.

As illustrated in FIG. 3, in the Doppler sonar 10, the transducer 11 includes a plurality of transducer elements 111 arranged in an array, and as illustrated in FIG. 5, the echo signal generation module 101 forms the first reception beam RB1, the second reception beam RB2, and the third reception beam RB3 in the first direction d1, the second direction d2, and the third direction d3, respectively, to generate the first echo signal, the second echo signal, and the third echo signal. Thus, the first echo signal, the second echo signal and the third echo signal based on reflected waves from the first direction d1, the second direction d2 and the third direction d3 can be smoothly generated.

Second Embodiment

In the first embodiment, as illustrated in FIG. 3, the transducer 11 in which a large number of transducer elements 111 are arranged on the same plane at the predetermined pitch d is used. On the other hand, in the present embodiment, a transducer including a first transducer element, a second transducer element, and a third transducer element for transmitting and receiving waves in the first direction d1, the second direction d2, and the third direction d3, respectively, is used.

Figure 7:
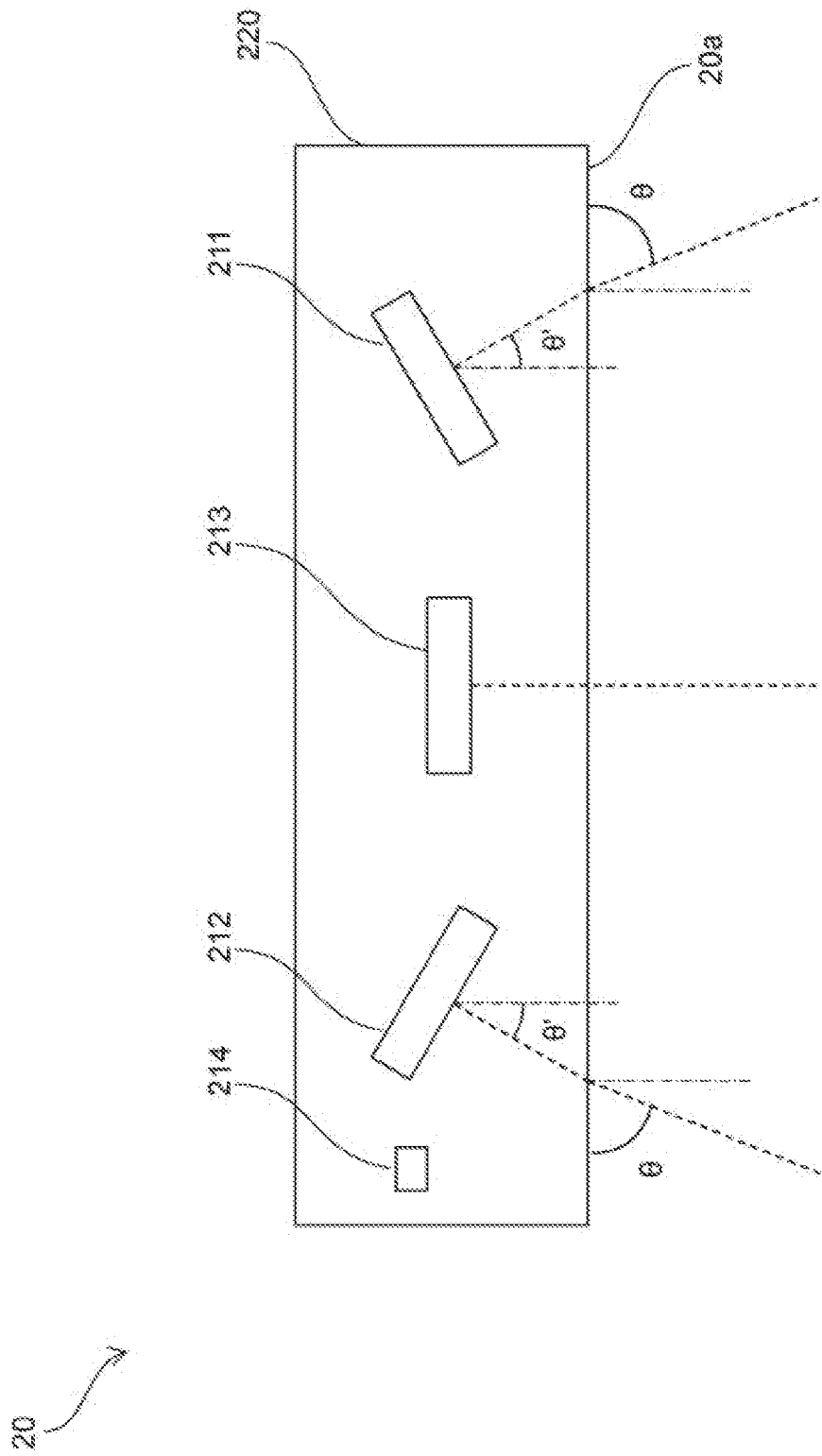
FIG. 7 is a side view schematically illustrating a configuration of a transducer used in a Doppler sonar according to a second embodiment.

FIG. 7 is a side view schematically illustrating a configuration of a transducer 20 used in the Doppler sonar 10 according to the second embodiment.

As illustrated in FIG. 7, the transducer 20 includes a 1st transducer element 211, a 2nd transducer element 212, and a 3rd transducer element 213. The 1st transducer element 211 and the 2nd transducer element 212 are inclined with a receiving surface 20a of the transducer 20 by a same angle θ' in the lateral direction. The 3rd transducer element 213 is arranged parallel to the wave receiving surface 20a. The 1st transducer element 211, the 2nd transducer element 212 and the 3rd transducer element 213 are molded in a support 220 made of a material such as urethane.

Further, a temperature sensor 214 for detecting temperature in a vicinity of the wave receiving surface 20a in the support 220, together with the 1st transducer element 211, the 2nd transducer element 212, and the 3rd transducer element 213, is molded inside the support 220. The lower surface of the support 220 is a plane, and this plane serves as the wave receiving surface 20a.

Ultrasonic waves and reflected waves transmitted and received to and from the 1st transducer element 211 and the 2nd transducer element 212 are refracted on the receiving surface 20a. The angle formed by the refracted ultrasonic wave and the receiving surface 20a is the depression angle θ. Since the 3rd transducer element 213 is arranged in parallel with the receiving surface 20a, the ultrasonic wave and the reflected wave transmitted and received to and from the 3rd transducer element 213 are not refracted by the receiving surface 20a. The ultrasonic waves transmitted from the 1st transducer element 211, the 2nd transducer element 212 and the 3rd transducer element 213 pass through the receiving surface 20a, and then proceed to the water at a predetermined angle width.

Figure 8:
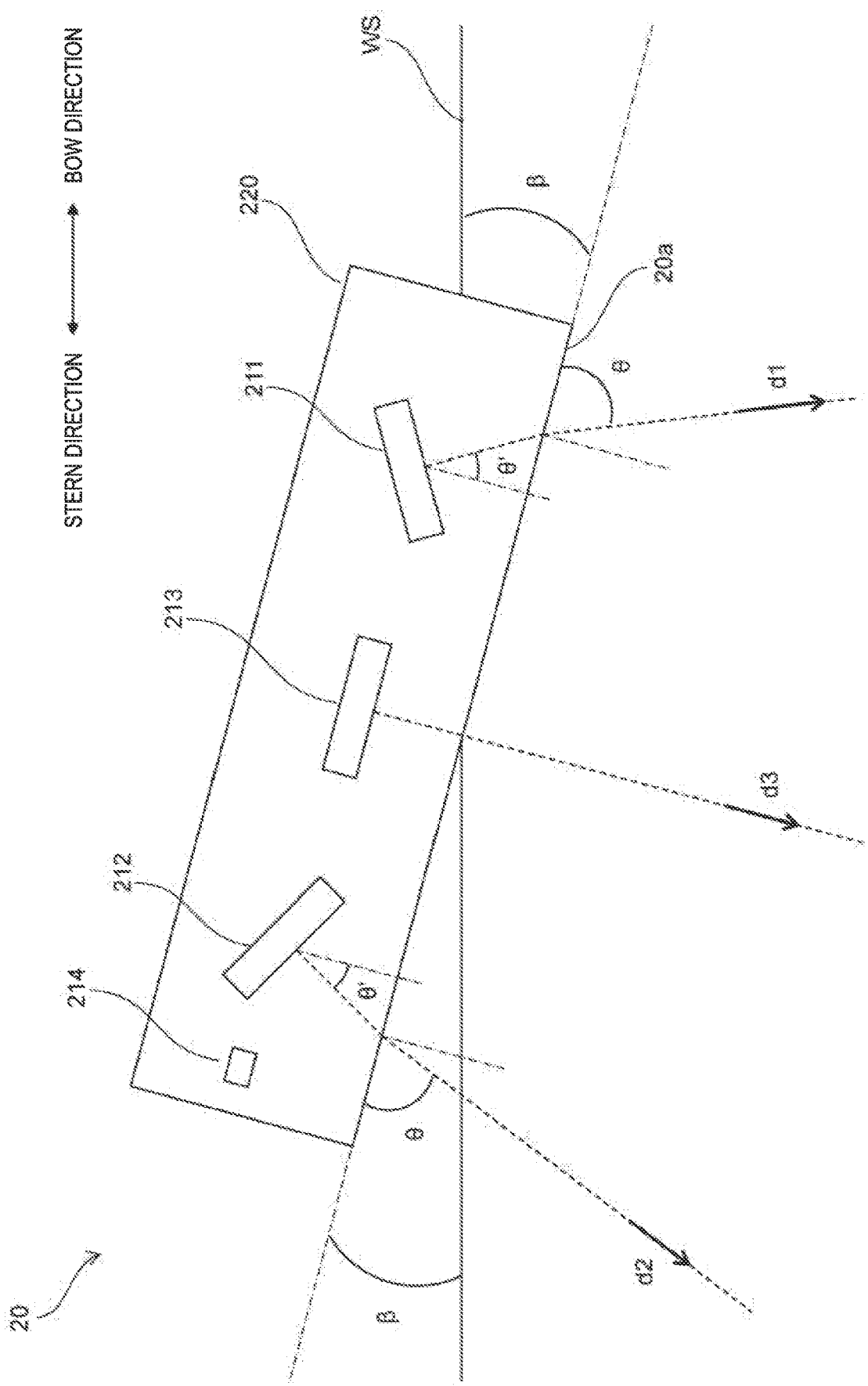
FIG. 8 is a side view schematically illustrating a transducer arrangement according to the second embodiment.

FIG. 8 is a side view schematically illustrating an arrangement of the transducer 20.

In the second embodiment, as in the first embodiment, the transducer 20 is disposed so that the receiving surface 20a is inclined at the angle β with respect to the water surface WS. As a result, as in the case of FIG. 1, the first Doppler frequency fd1, the second Doppler frequency fd2, and the third Doppler frequency fd3 based on the speed over ground $V_G$ are obtained by the equations (1) to (3), respectively, and the depression angle θ at each water depth in the water is calculated by the equation (4).

However, in the configuration of the second embodiment, refraction occurs on the receiving surface 20a, and the sound velocity changes inside and outside the support 220. Therefore, in the second embodiment, the equation for estimating the sound velocity at each water depth is changed from the above equation (5) to the following equation.

$$\frac{c'}{c} = \frac{\sin\theta'}{\sin(\frac{\pi}{2} - \theta)} \quad (6)$$

In equation (6), c' is a velocity at which ultrasonic waves transmitted from the 1st transducer element 211, the 2nd transducer element 212, and the 3rd transducer element 213 propagate through the material in the support 220, and can be defined by the material and the temperature of the material near the receiving surface 20a, that is, the temperature detected by the temperature sensor 214. Further, θ' is a mounting angle of the 1st transducer element 211 and the 2nd transducer element 212 illustrated in FIG. 8, and it is predetermined. Therefore, by substituting the depression angle θ at each water depth calculated by the above equation (4), the sound velocity c' of the material in the support 220, and the mounting angle θ' of the 1st transducer element 211 and the 2nd transducer element 212 into the above equation (6), the sound velocity c at each water depth can be calculated.

The Doppler sonar 10 has the same configuration as that of FIG. 2 except for the configuration of the transducer 20, and the control processing circuit 16 has the same configuration as that of FIG. 4A. Further, the control processing circuit 16 performs the same processing as in FIG. 6 with the configuration of FIG. 4A.

However, in step S11 of FIG. 6, the control processing circuit 16 uses the 1st transducer element 211, the 2nd transducer element 212, and the 3rd transducer element 213 to transmit ultrasonic waves and receive reflected waves in the 1st direction d1, the 2nd direction d2, and the 3rd direction d3. In the configuration of FIG. 4A, the echo signal generation module 101 generates the 1st echo signal, the 2nd echo signal, and the 3rd echo signal by using the received signals (received signals after amplification and noise removal by the reception amplifier 15) outputted from the 1st transducer element 211, the 2nd transducer element 212, and the 3rd transducer element 213 as they are by receiving the reflected waves, without generating the reception beams by beam forming as in the first embodiment (Steps S12 through S14 of FIG. 6).

Similar to the first embodiment, the Doppler frequency calculation module 102 specifies a time position corresponding to each water depth from the input 1st echo signal, 2nd echo signal, and 3rd echo signal, and calculates the 1st Doppler frequency fd1, the 2nd Doppler frequency fd2, and the 3rd Doppler frequency fd3 from the specified time position (Steps S15 through S17 of FIG. 6). As in the first embodiment, the depression angle calculation module 103 substitutes the first Doppler frequency fd1, the second Doppler frequency fd2, and the third Doppler frequency fd3 calculated at each water depth into the equation (4) to calculate the depression angle θ at each water depth (S18).

In step S19 of FIG. 6, unlike the first embodiment, the sound velocity profile calculation module 104 calculates the sound velocity c at each water depth by substituting the calculated depression angle θ at each water depth into the equation (6). At this time, the sound velocity profile calculation module 104 determines, based on the temperature detected by the temperature sensor 214, the sound velocity c' through which the ultrasonic waves transmitted from the 1st transducer element 211, the 2nd transducer element 212, and the 3rd transducer element 213 propagate the material in the vicinity of the receiving surface 20a in the support 220, and substitutes the determined sound velocity c' and the known mounting angle θ' into the equation (6).

The sound velocity c' may be obtained from a conversion table in which the temperature detected by the temperature sensor 214 and the sound velocity c' are associated with each other. In this case, the sound velocity profile calculation module 104 holds the conversion table in advance, and acquires the sound velocity c' corresponding to the temperature detected by the temperature sensor 214 from the conversion table. In addition, the sound velocity profile calculation module 104 may also perform the calculation from an equation that defines a relationship between the temperature detected by the temperature sensor 214 and the sound velocity c'.

In step S19, the processing of the temperature profile calculation module 105 is the same as that in the above-described first embodiment. The temperature profile calculation module 105 calculates the temperature at each water depth by applying the sound velocity c calculated at each water depth by the equation (6) to a predetermined equation such as the equation of Machenzie. The processing in step S20 is the same as in the above-described first embodiment. Thus, the temperature profile immediately below the ship S1 is displayed on the display device 17.

Effects of the Second Embodiment

In the second embodiment, the same effects as in the first embodiment can be achieved.

Furthermore, in the second embodiment, as illustrated in FIG. 7, compared with the transducer 11 of the first embodiment, since the configuration of the transducer 20 is simple, the temperature profile can be displayed in real time by a simpler configuration.

In the second embodiment, in step S20 of FIG. 6, the sound velocity profile and the depression angle profile may be displayed instead of the temperature profile. Also in the second embodiment, the control processing circuit 16 may have the configuration illustrated in FIG. 4B. In this case, the temperature profile calculation module 106 directly calculates the temperature profile from the depression angle θ at each water depth calculated by the depression angle calculation module 103 and the sound velocity c' in the support 220 and the mounting angle θ' of the 1st transducer element 211 and the 2nd transducer element 212 by a combination equation of the equation (6) and an equation such as the equation of Machenzie. Also in this case, in step S20 of FIG. 6, the temperature profile immediately below the ship S1 is displayed on the display device 17 in real time.

<Modification 1>

In the first and second embodiments, the plane including the first direction d1, the second direction d2, and the third direction d3 is parallel to the traveling direction of the ship S1, but the plane may be inclined by an angle α in the horizontal direction with respect to the traveling direction of the ship S1.

Figure 9B:
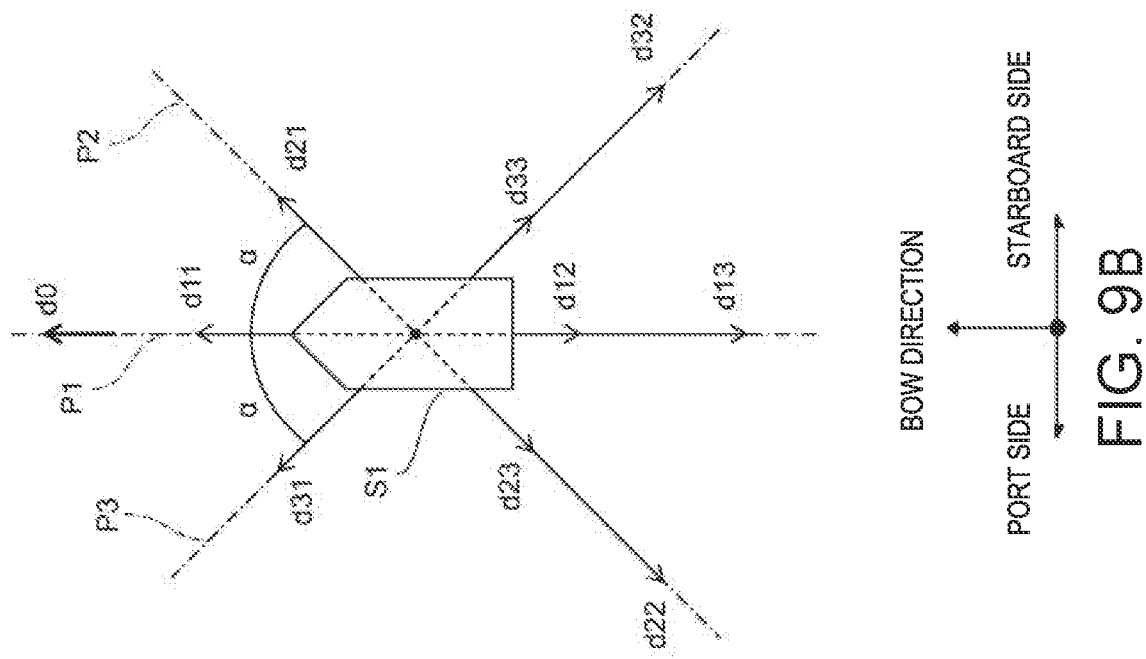
FIG. 9B is a plan view of a first direction, a second direction, and a third direction when three sets of the first direction, the second direction, and the third direction are set according to a second modification, as viewed from above a ship S1.
Figure 9A:
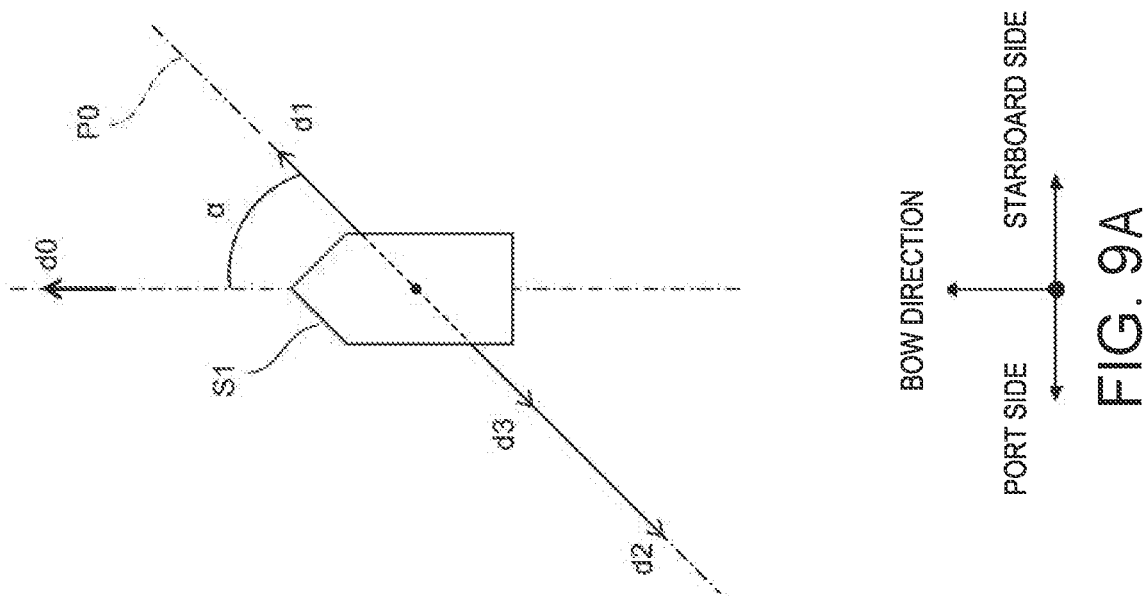
FIG. 9A is a plan view of a first direction, a second direction and a third direction as viewed from above according to a first modification.

FIG. 9A is a plan view of a state of the first direction d1, the second direction d2, and the third direction d3 in this case when viewed from above the ship S1.

As illustrated in FIG. 9A, in the modification 1, the plane P0 (plane parallel to the vertical direction) including the first direction d1, the second direction d2, and the third direction d3 is inclined by the angle α in the horizontal direction with respect to the traveling direction d0 of the ship S1. That is, in the modification 1, formation directions of the first reception beam RB1, the second reception beam RB2, and the third reception beam RB3 shown in the first embodiment are inclined by the angle α with respect to the traveling direction d0 of the ship S1 in a plan view. As in the first embodiment, the 1st direction d1 and the 2nd direction d2 have the depression angle θ with respect to the wave receiving surface 11a. The receiving surface 11a is inclined at the angle β with respect to the water surface WS.

In this case, the Doppler frequency at each water depth acquired from the first reception beam RB1, the second reception beam RB2, and the third reception beam RB3 is calculated by the following equation.

$$fd1 = \frac{2f_0}{c} V_G \cos(\theta + \beta)\cos\alpha \quad (7)$$

$$fd2 = -\frac{2f_0}{c} V_G \cos(\theta - \beta)\cos\alpha \quad (8)$$

$$fd3 = -\frac{2f_0}{c} V_G \sin\beta\cos\alpha \quad (9)$$

When the left side of the equation (4) is calculated by the above equations (7) to (9), cos α of the numerator and denominator is reduced to obtain the same equation as the above equation (4). Therefore, also in this case, as in the first embodiment, by calculating the first Doppler frequency fd1, the second Doppler frequency fd2, and the third Doppler frequency fd3 at each water depth by the first reception beam RB1, the second reception beam RB2, and the third reception beam RB3, the depression angle θ at each water depth can be calculated by the equation (4), and the sound velocity profile and the temperature profile can be calculated as in the first embodiment.

In the method shown in FIG. 9A, the first Doppler frequency fd1 and the second Doppler frequency fd2 are smaller than those in the case where the plane P0 is parallel to the traveling direction of the ship S1 as in the first embodiment by an amount of cos α. Therefore, the difference between the first Doppler frequency fd1 and the second Doppler frequency fd2 calculated on the left side of the equation (4) is smaller than in the first embodiment. Therefore, in the case of FIG. 9A, the difference is more susceptible to the influence of noise or the like than in the first embodiment, and the calculation accuracy of the depression angle θ is lowered.

Therefore, in order to enhance the calculation accuracy of the depression angle θ, as in the first embodiment, it is preferable to bring the plane P0 close to the traveling direction d0 of the ship S1, and it is most preferable to set the plane P0 parallel to the traveling direction d0 of the ship S1. Thus, the calculation accuracy of the sound velocity profile and the temperature profile can be maximized.

When the angle α between the traveling direction d0 of the ship S1 and the plane P0 is 90°, i.e., when the plane P0 is set parallel to the left and right direction of the ship S1, since Doppler shift does not occur in the 1st direction d1 and the 2nd direction d2, the depression angle θ at each water depth cannot be calculated. Therefore, as illustrated in FIG. 9A, when the plane P0 is inclined with respect to the traveling direction d0 of the ship S1, the angle α must be set to less than 90°.

The method of FIG. 9A is also applicable to the second embodiment. However, in this case as well, for the same reason as described above, the calculation accuracy of the depression angle θ is lowered as compared with the case where the plane P0 is set parallel to the traveling direction d0 of the ship S1. Therefore, even in the configuration of the second embodiment, the plane P0 including the first direction d1, the second direction d2, and the third direction d3 is most preferably set parallel to the traveling direction d0 of the ship S1.

<Modification 2>

In the first and second embodiments, one set of the first direction d1, the second direction d2, and the third direction d3 is provided, but a plurality of sets may be provided.

FIG. 9B is a plan view of the first direction, the second direction, and the third direction when three sets of the first direction, the second direction, and the third direction are set, as viewed from above the ship S1.

Here, three planes P1, P2 and P3 parallel to the vertical direction are set. The plane P1 is parallel to the traveling direction d0 of the ship S1, and the planes P2 and P3 are inclined in horizontal directions different from each other by the angle α with respect to the traveling direction d0 of the ship S1. A 1st direction d11, a 2nd direction d12 and a 3rd direction d13 are set on the plane P1, a 1st direction d21, a 2nd direction d22 and a 3rd direction d23 are set on the plane P2, and a 1st direction d31, a 2nd direction d32 and a 3rd direction d33 are set on the plane P3.

When the configuration of FIG. 9B is applied to the configuration of the above-described first embodiment, reception beams are formed in the 1st direction d11, the 2nd direction d12, and the 3rd direction d13, respectively, and the depression angle θ at each water depth is calculated by the above equation (4). Further, reception beams are formed in the 1st direction d21, the 2nd direction d22, and the 3rd direction d23, respectively, to calculate the depression angle θ at respective depths, and reception beams are formed in the 1st direction d31, the 2nd direction d32, and the 3rd direction d33, respectively, to calculate the depression angle θ at respective depths. Thus, the depression angle θ at each depth is calculated for each set of the 1st direction, the 2nd direction and the 3rd direction (for each plane P1, P2, P3).

In this case, the depression angle calculation module 103 in FIG. 4A sets a representative value of the depression angle θ at each depth using the depression angle θ at each depth calculated for each set. For example, the depression angle calculation module 103 sets the average value of the depression angles θ at the respective depths calculated for the respective sets as the representative value of the depression angle θ at the respective depths. The sound velocity profile calculation module 104 illustrated in FIG. 4A calculates a sound velocity profile using the representative value of the depression angle θ at each water depth.

However, as described in the modification 1, the depression angle θ calculated with respect to the plane P1 parallel to the traveling direction d0 of the ship S1 is more accurate than the depression angles θ calculated with respect to the planes P2 and P3 inclined with respect to the traveling direction d0 of the ship S1. Therefore, when the average value of the depression angle θ is used as the representative value as described above, a weight of the depression angle θ calculated for the plane P1 may be set larger than that of the depression angles θ calculated for the planes P2 and P3 to perform a weighted average, and this average value may be set as the representative value of the depression angle θ.

In this case, a magnitude of the weighting may be set so as to become smaller as the angle formed between the traveling direction d0 of the ship S1 and each plane becomes larger. When the angles α formed by the planes P2, P3 and the traveling direction d0 are different, the weight of the depression angle θ calculated for the plane P2 and the plane P3 may be made different according to the magnitude of the angle α formed.

Alternatively, the depression angle θ calculated for each plane may be selectively used to set the depression angle θ as the representative value of the depression angle θ at each water depth. For example, normally, the depression angle θ obtained for the plane P1 and having the highest accuracy is set as the representative value, and when the depression angle θ calculated for the plane P1 is significantly different from the depression angles θ calculated for the other two planes P2, P3, the average value of the depression angles θ calculated for the other two planes P2, P3, or either one of the depression angles θ may be set as the representative value.

Thus, by setting a plurality of sets of the first direction, the second direction and the third direction, the depression angle θ at each water depth can be more accurately and stably calculated, although the arithmetic processing is increased. Thus, the accuracy of the sound velocity profile and the temperature profile can be enhanced.

The method of FIG. 9B is also applicable to the second embodiment. In this case, it is necessary to arrange the transducer 20 separately for each plane.

<Other Modifications>

In the first and second embodiments and the modifications 1 and 2, the depression angle θ, the sound velocity c, and the temperature are calculated at a plurality of water depths, but the depression angle θ, the sound velocity c, and the temperature may be calculated at one targeted water depth. In this case, the user may appropriately change the targeted depth to a desired depth. Alternatively, the user may optionally set a plurality of targeted depths.

Further, in the first and second embodiments and the modifications 1 and 2, each transducer element performs transmission and reception, however, transducer elements for transmission and transducer elements for reception may be separately arranged so long as the Doppler frequencies based on the reflected waves from the first direction, the second direction and the third direction can be calculated.

The configurations of the transducers 11 and 20 are not limited to the configurations shown in the first and second embodiments, and may be other configurations as long as Doppler frequencies based on reflected waves from the 1st direction, the 2nd direction, and the 3rd direction can be calculated. For example, in the transducer 11 of the first embodiment, the number and layout of the transducer elements 111 may be changed, and the pitch d between the transducer elements 111 may also be changed from ⅔ of the wavelength λ of the transmission drive signal.

When the pitch d between the transducer elements 111 is changed, the equation (5) is also changed. For example, when the depression angle θ of the 1st direction d1 and the 2nd direction d2 with respect to the receiving surface 11a is set to 60° (pi/3 rad), and the pitch d between the transducer elements 111 is changed to ⅓ of the wavelength λ of the transmission drive signal, the denominator of the right side of the equation (5) is corrected to 6f0·d. When the depression angle θ in the 1st direction d1 and the 2nd direction d2 with respect to the receiving surface 11a is changed from 60° (pi/3 rad), the equation (5) is also changed accordingly.

In addition, embodiments of the present disclosure may be modified in various ways as appropriate within the scope of the claims.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated" and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A Doppler device, comprising:
   a transducer configured to transmit underwater ultrasonic wave and receive a reflected wave of the ultrasonic wave; and
   processing circuitry configured to:
      generate a first echo signal from the reflected wave in a first direction making a depression angle $\theta$ with a receiving surface of the transducer,
      generate a second echo signal from the reflected wave in a second direction making the depression angle $\theta$ with the receiving surface of the transducer, the second direction being different from the first direction,
      generate a third echo signal from the reflected wave in a third direction perpendicular to the receiving surface of the transducer,
      calculate a first Doppler frequency of the first echo signal,
      calculate a second Doppler frequency of the second echo signal,
      calculate a third Doppler frequency of the third echo signal, and calculate the depression angle θ from the first Doppler frequency, the second Doppler frequency, and the third Doppler frequency.

2. The Doppler device of claim 1, wherein:
the processing circuitry is configured to:
calculate the first Doppler frequency, the second Doppler frequency and the third Doppler frequency from the first echo signal, the second echo signal and the third echo signal at a plurality of depths, and
calculate the depression angle θ at each of the plurality of depths.

3. The Doppler device of claim 1, wherein:
the first direction, the second direction and the third direction are set in a same plane perpendicular to the receiving surface of the transducer.

4. The Doppler device of claim 1, wherein:
the receiving surface of the transducer is configured to make a non-zero β angle with the water surface.

5. The Doppler device of claim 1, wherein:
the processing circuitry is configured to calculate the depression angle θ based on a ratio of the first Doppler frequency and the third Doppler frequency and a ratio of the second Doppler frequency and the third Doppler frequency.

6. The Doppler device of claim 1, wherein:
the processing circuitry is configured to calculate the depression angle θ based on a sum of the first Doppler frequency and the second Doppler frequency, and a multiplicative inverse of the third Doppler frequency.

7. The Doppler device of claim 1, wherein:
the processing circuitry is further configured to calculate a sound velocity of ultrasound in water from the depression angle θ.

8. The Doppler device of claim 7, wherein:
the processing circuitry is further configured to calculate a water temperature from the sound velocity.

9. The Doppler device of claim 1, wherein:
the processing circuitry is further configured to calculate a water temperature from the depression angle θ.

10. The Doppler device of claim 1, wherein:
the transducer comprises a plurality of transducer elements arranged in an array; and
the processing circuitry is configured to form a first beam, a second beam, and a third beam respectively in the first direction, the second direction, and the third direction to generate the first echo signal, the second echo signal, and the third echo signal.

11. The Doppler device of claim 1, wherein:
the transducer comprises a first transducer element, a second transducer element, and a third transducer element for transmitting and receiving respectively in the first direction, the second direction, and the third direction; and the processing circuitry is configured to generate the first echo signal, the second echo signal, and the third echo signal from reflected waves received by the first transducer element, the second transducer element, and the third transducer element.

12. A depression angle estimation method, comprising:
transmitting underwater ultrasonic wave from a transducer;
receiving a reflected wave of the ultrasonic wave with the transducer;
generating a first echo signal from the reflected wave in a first direction making a depression angle θ with a receiving surface of the transducer;
generating a second echo signal from the reflected wave in a second direction making the depression angle θ with the receiving surface, the second direction being different from the first direction;
generating a third echo signal from the reflected wave in a third direction perpendicular to the receiving surface;
calculating a first Doppler frequency of the first echo signal;
calculating a second Doppler frequency of the second echo signal;
calculating a third Doppler frequency of the third echo signal; and
calculating the depression angle θ from the first Doppler frequency, the second Doppler frequency, and the third Doppler frequency.

13. A non-transitory computer-readable medium having stored thereon computer-executable instructions for causing a control processing circuit of a Doppler device which transmits an ultrasonic wave into water by a transducer and receives a reflected wave of the ultrasonic wave to generate a first echo signal in a first direction making a depression angle θ with a receiving surface of the transducer, a second echo signal in a second direction making the depression angle θ with the receiving surface, the second direction being different from the first direction, and a third echo signal in a third direction perpendicular to the receiving surface, the computer-executable instructions when executed by a computer, cause the computer to:
calculate a first Doppler frequency of the first echo signal;
calculate a second Doppler frequency of the second echo signal;
calculate a third Doppler frequency of the third echo signal; and
calculate the depression angle θ from the first Doppler frequency, the second Doppler frequency, and the third Doppler frequency.

* * * * *